United States Patent [19]

Sulin

[11] Patent Number: 4,591,274
[45] Date of Patent: May 27, 1986

[54] MIXING NOZZLE FOR INJECTION MOLDING

[76] Inventor: George Sulin, 16704 Woodbury Ave., Cleveland, Ohio 44135

[21] Appl. No.: 664,610

[22] Filed: Oct. 25, 1984

[51] Int. Cl.⁴ .............................................. B01F 5/00
[52] U.S. Cl. ................................... 366/336; 366/340; 425/568
[58] Field of Search ................. 366/336, 340; 425/568

[56] References Cited

U.S. PATENT DOCUMENTS

| | | | |
|---|---|---|---|
| 3,089,683 | 5/1963 | Thomas et al. | 366/340 |
| 3,941,355 | 3/1976 | Simpson | 366/336 |
| 4,305,672 | 12/1981 | Adams | 366/336 |

*Primary Examiner*—Willard E. Hoag
*Attorney, Agent, or Firm*—Oldham, Oldham & Weber Co.

[57] ABSTRACT

A mixing nozzle for injection molding of plastic materials. The invention includes a casing which has a bore therein for receiving a cylindrical mixing element. Each end of the mixing element has a bore therein which terminates at a center section. The bores communicate through holes which radially extend from grooves in the end sections to the bores. The grooves communicate with a center section which is characterized by a plurality of ribs circumferentially passing thereabout. The areas between the ribs are of reduced diameter, while the ribs themselves are of a diameter equal to the major portion of the mixing element. Longitudinal grooves interconnect the areas between the adjacent ribs. Liquid plastic carrying a pigment is introduced into one end of the casing, passes through the bores and holes, along the grooves, and then circuitously finds its way through the center section to the opposite end where the plastic passes along the grooves, down the radial holes, into the bore, and into an injection mold. A large number of 90 degree path changes are incorporated to achieve thorough mixing of the liquid plastic and pigment.

13 Claims, 7 Drawing Figures

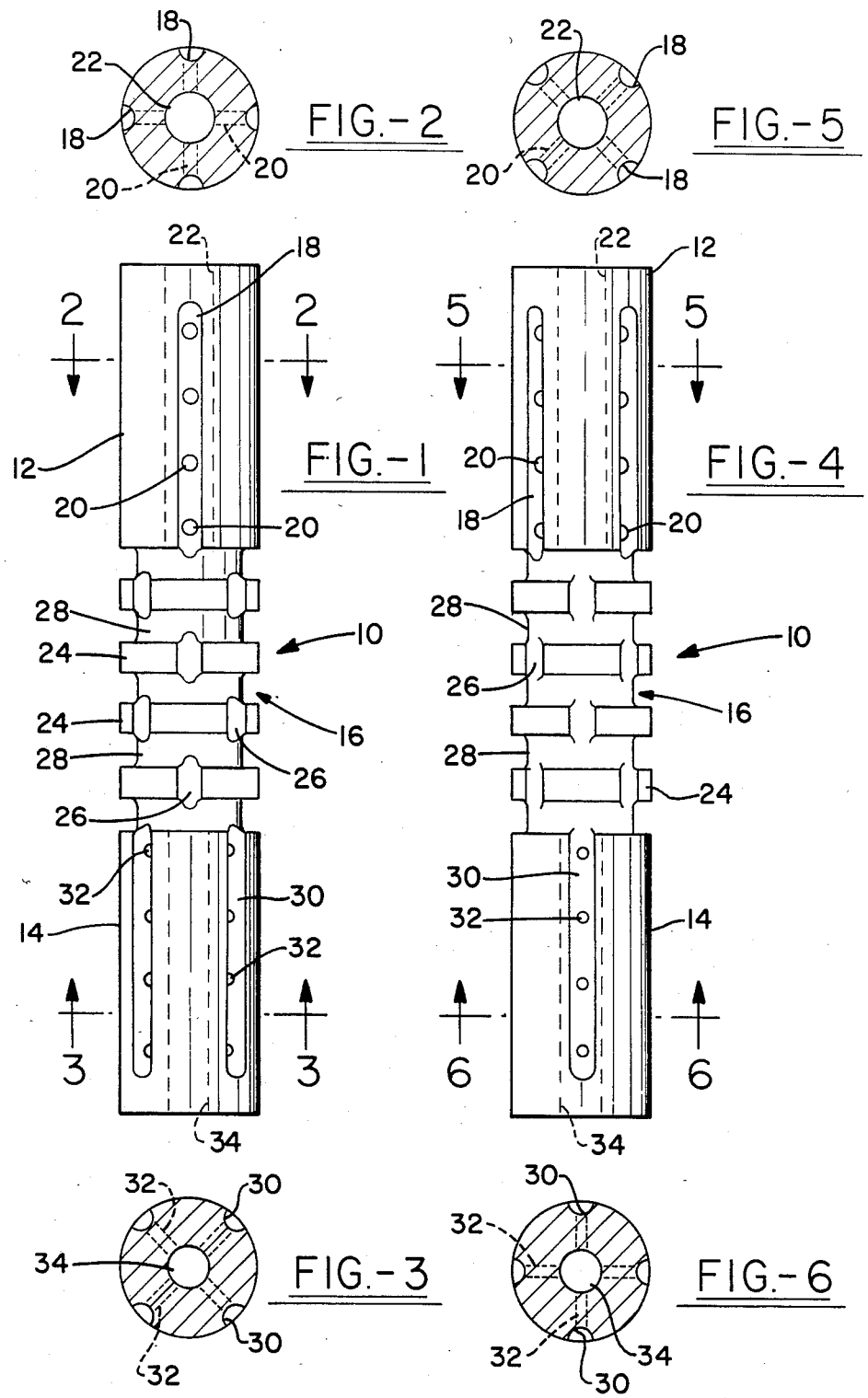

4,591,274

MIXING NOZZLE FOR INJECTION MOLDING

TECHNICAL FIELD

The invention herein resides in the art of injection molding apparatus. More particularly, the invention relates to a nozzle assembly including a unique color mixer for injection molding of colored plastics.

BACKGROUND ART

In today's world, many devices and apparatus which were formerly made of metal or wood are now formed from plastic. In many instances, plastic articles are made using a process known as injection molding. Such a technique allows for the rapid and efficient manufacture of plastic articles and devices, greatly reducing the cost of such articles over similar articles of metal or wood construction. Further, plastic articles are typically lightweight, durable, and capable of being permeated with a color, rather than simply having the color applied as a coating.

Presently, injection nozzles are used for injecting liquid plastic into molds. A mixer is commonly used to blend a color pigment through the plastic before it is injected into the mold in an attempt to achieve a homogeneous color. However, known mixers and nozzles are both inefficient and ineffective in achieving such a homogeneous blend of color pigment into the plastic, requiring large amounts of energy in the mixing process, and excessive amounts of pigment to compensate for the lack of a total blend. Using presently known mixers, the resulting plastic is often characterized by streaks of heavy pigment and light pigment areas.

SUMMARY OF THE INVENTION

In light of the foregoing, it is an object of a first aspect of the invention to provide a mixing nozzle for injection molding which is capable of achieving homogeneous pigment dispersion within the plastic.

Another object of an aspect of the invention is the provision of a mixing nozzle for injection molding which is energy efficient, requiring less energy or pressure than previously known systems.

Still an additional object of an aspect of the invention is to provide a mixing nozzle for injection molding which reduces the amount of pigment necessary to achieve a desired color.

A further object of an aspect of the invention is the provision of a mixing nozzle for injection molding which eliminates streaking of color density within the resultant product.

Yet another object of an aspect of the invention is the provision of a mixing nozzle for injection molding which is relatively inexpensive to construct and operate, while being easily implemented with existing injection molds.

The foregoing and other objects of the aspects of the invention are achieved by a mixing nozzle assembly for injection molding, comprising: a casing having a first bore therein; and a mixing member received within said first bore, said mixing member and first bore being of substantially the same diameter, said mixing member having first and second ends, each end with an axial bore therein, each axial bore communicating with a uniquely associated plurality of radially extending holes, and center section connecting said first and second ends with a plurality of interconnected passages.

DESCRIPTION OF THE DRAWINGS

For a complete understanding of the objects, techniques and structure of the invention reference should be had to the following detailed description and accompanying drawings wherein:

FIG. 1 is a perspective view of the mixer of the invention;

FIG. 2 is a sectional end view of the mixer of FIG. 1 taken along the line 2—2;

FIG. 3 is a sectional end view of the mixer of FIG. 1 taken along the line 3—3;

FIG. 4 is a perspective view of the mixer of FIG. 1, rotated 45 degrees;

FIG. 5 is a sectional end view of the mixer of FIG. 4, taken along the line 5—5;

FIG. 6 is a sectional end view of the mixer of FIG. 4, taken along the line 6—6.

DETAILED DESCRIPTION OF PREFERRED EMBODIMENT

Figure 7:
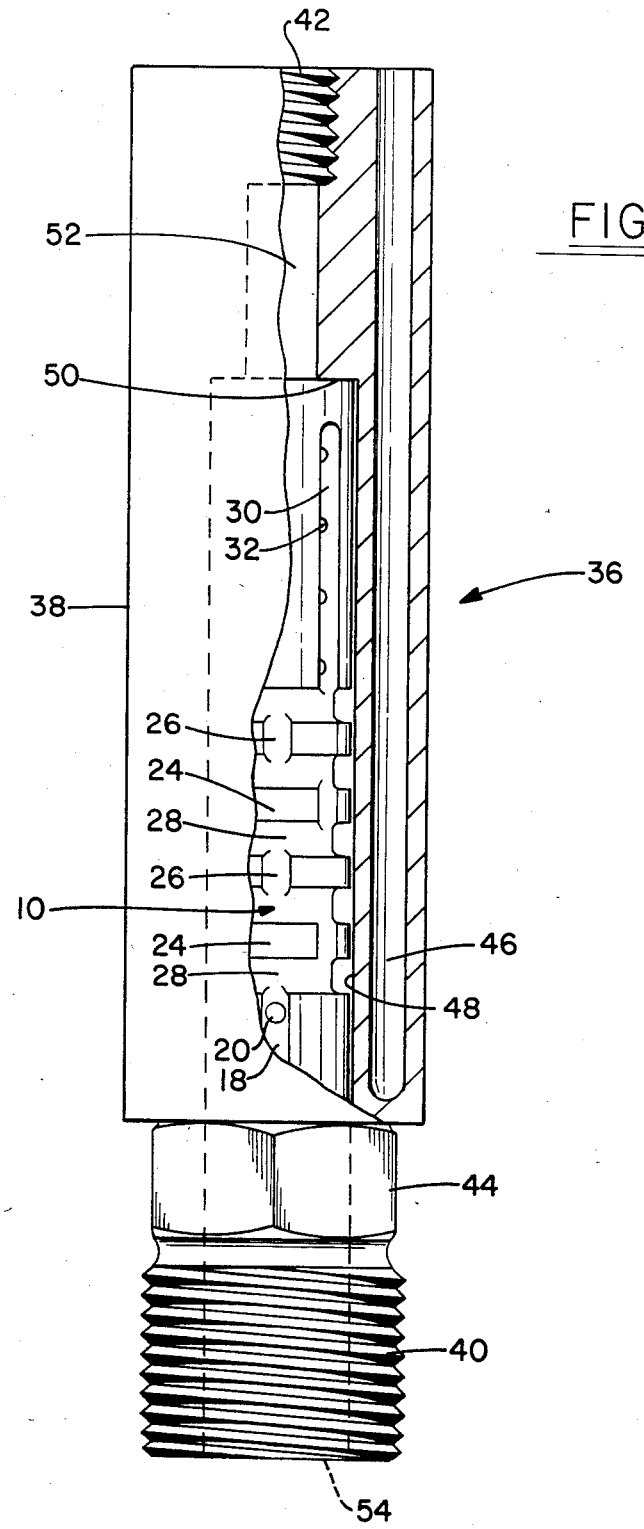
FIG. 7 is a partial sectional view of the nozzle assembly of the invention.

With reference now to FIGS. 1-6, it can be seen that the mixer of the spray nozzle assembly of the invention is designated generally by the numeral 10. The mixer 10 is preferably of a cylindrical shape, and is typically made of steel, although other suitable materials may be employed. The mixer 10 includes an input cylindrical end 12, an output cylindrical end 14, and a center cylindrical section 16. Longitudinal grooves 18 are machined in the end 12 as shown. In the preferred embodiment, four such grooves 18 are provided at 90 degree intervals, but the number of such grooves may vary dependent upon the nature of the plastic contemplated for use. Each of the grooves 18 is characterized by a plurality of radial bores or holes 20, each communicating from the groove 18 to an axial bore 22 centrally maintained within the end 12 for the length thereof.

The center section 16 is of solid construction, having no axial bore passing therethrough. It is characterized by a plurality of circumferential ribs 24, of the same diameter as the input and output ends 12,14. Each rib is divided into four equal sections by the provision of the grooves 26, spaced at 90 degree intervals thereabout. It will be noted that the grooves 26 of alternating ribs 24 are offset with respect to each other by half of the spacing between the grooves 26, in this case 45 degrees. The grooves 26 are machined into the ribs 24 to the depth of the lands 28 maintained between the ribs. The lands 28 are also preferably machined to the same depth as the groove 18 in the end 24 and the groove 30 in the end 14, the latter of which will be discussed directly below.

The end section 14 is characterized by four grooves 30, equally spaced at 90 degree intervals about that end section. The grooves 30 are each characterized by a plurality of radially extending bores or holes 32 which communicate from the grooves 30 to a bore 34 maintained centrally within the end section 14. As can be seen, the grooves 30 are symmetrically offset with respect to the grooves 18, in this case by 45 degrees. It will also be noted that the grooves 26 of half of the ribs 24 align with the grooves 18, while the grooves 26 of the other half of the ribs 24 align with the grooves 30.

With specific reference now to FIG. 7, it can be seen that the spray nozzle assembly of the invention is designated generally by the numeral 36. The nozzle assembly includes a tubular casing 38, preferably of steel construction, having a threaded end 40 adapted for being affixed to a source of liquid plastic, and a threaded end 42 adapted to be attached to an injection mold. Flats 44 near the threaded end 40 allow for the application of a wrench or other suitable tool to affix or tighten the nozzle assembly to the liquid plastic source. It will be also noted that in the preferred embodiment of the invention, the casing 38 is hollow walled as at 46.

A bore 48 extends from the end 40 of the casing 38 a sufficient distance to allow receipt of the mixer 10. The bore 48 is of substantially the same diameter as the mixer 10, allowing only sufficient clearance that the mixer 10 may readily be received within the bore. The mixer 10 is received upon a seat 50 at one end of the bore. A passage or bore 52 communicates with the bore 34 of the mixer 10 to the threaded end 42, while the bore 22 communicates with a bore 54 in the threaded end 40.

In operation, liquid plastic enters through the bore 54 at the threaded end 40 and, because the diameter of the mixer 10 is substantially equal to that of the bore 48, the plastic enters the bore 22 at the input end 12 of the mixer 10. The plastic then squirts out of the holes 20 and down the passage defined between the groove 18 and the inner wall of the bore 48. The liquid plastic, upon reaching the end of the groove 18, is forced into the rib 24, and then finds its way along the passages defined by the lands 28 and grooves 26 between the ribs 24. The plastic eventually finds its way to the grooves 30 where it is forced down the holes 32 and into the bore 34 where it is then sprayed into the injection mold.

It will be appreciated that the path of the liquid plastic from the source to the mold is characterized by a large plurality of 90 degree changes in direction. The plastic changes 90 degrees going from the bore 22 to the hole 20, then again from the hole 20 to the passage defined by the groove 18. The entire length of the center section 16 is characterized by 90 degree path changes, and such changes are again experienced at the end section 14 where the plastic exits the groove 30 via the holes 32 into the bore 34. Of course, the liquid plastic is forced under high pressure at a rapid rate. This rapid movement, coupled with the turbulence created by the circuitous path the plastic must take, results in a homogeneous mixing of the pigment contained within the plastic with the liquid plastic itself. Accordingly, less pigment can be used to attain a desired color, and streaking is eliminated.

It will also be noted that, in the preferred embodiment, the entry bore 22 is of larger diameter than the exit bore 34, and the holes or bores 20 in the input end 12 are of greater diameter than the holes or bores 32 in the output end 14. This difference in bore diameter results in changes in flow rates, achieving further turbulence and better mixing of the pigment and plastic.

Thus it can be seen that the objects of the invention have been satisfied by the structure presented hereinabove. While in accordance with the patent statutes only the best mode and preferred embodiment of the invention has been presented and described in detail, it is to be understood that the invention is not limited thereto or thereby. Accordingly, for an appreciation of the true scope and breadth of the invention reference should be had to the appended claims.

What is claimed is:

1. A mixing nozzle assembly for injection molding, comprising:
   a casing having a first bore therein;
   a mixing member received in said first bore, said mixing member and first bore being of substantially the same, diameter, said mixing member having first and second end portions, each end portion with an axial bore therein communicating with an associated plurality of radially extending holes, said first and second end portions each having a plurality of longitudinally extending grooves in communication with said center section, said radially extending holes passing through said grooves; and
   an imperforate solid center section interconnecting said first and second end portions, said center section characterized by a plurality of interconnected passages extending between said first and second end portions.

2. The mixing nozzle assembly according to claim 1 wherein said center section includes a plurality of circumferentially extending ribs, axially spaced from each other.

3. The mixing nozzle assembly according to claim 2 wherein each said rib has circumferentially spaced grooves therein, said grooves being to a depth to be in substantially flush communication with surfaces between said ribs.

4. The mixing nozzle assembly according to claim 3 wherein said grooves of sequentially spaced ribs are offset from each other, and wherein said grooves of alternately spaced ribs are aligned with each other.

5. The mixing nozzle assembly according to claim 1 wherein said longitudinally extending grooves of said first end are axially offset from said longitudinally extending grooves of said second end.

6. The mixing nozzle assembly according to claim 1 wherein said axial bore and said radially extending holes are of a larger diameter in said first end than in said second end.

7. A mixing nozzle assembly for injection molding, comprising:
   a cylindrical member having a first axial bore in a first end portions thereof and a second axial bore in a second end portions thereof, said first end portions having first longitudinal grooves communicating through first radial holes with said first bore, said second end having second longitudinal grooves communication through second radial holes with said second bore, and an imperforate solid center section interconnected with said first and second end portions and having a plurality of passages thereacross in communication with said first and second longitudinal grooves; and
   a casing having a bore therein of a diameter substantially equal to the diameter of said cylindrical member and receiving said cylindrical member therein.

8. The mixing nozzle assembly as recited in claim 7 wherein said first and second axial bores terminate at opposite ends of said center section.

9. The mixing nozzle assembly as recited in claim 8 wherein said center section is of a reduced diameter from said first and second ends and includes a plurality of circumferential ribs spaced therealong, said ribs being of substantially the same diameter as said first and second ends.

10. The mixing nozzle assembly as recited in claim 9 wherein said ribs include passages longitudinally grooved therein and spaced thereabout.

11. The mixing nozzle assembly as recited in claim 10 wherein the passages of alternate ribs are aligned and the passages of adjacent ribs are offset with respect to each other.

13. The mixing nozzle assembly as recited in claim 11 wherein the number of first and second grooves and the number of passages in each rib are the same.

13. The mixing nozzle assembly as recited in claim 9 wherein said reduced diameter of said center section is in substantially flush alignment with bottoms of said first and second longitudinal grooves.

* * * * *